United States Patent
Gan et al.

(10) Patent No.: US 11,435,863 B1
(45) Date of Patent: Sep. 6, 2022

(54) TOUCH SENSOR AND MANUFACTURING METHOD THEREOF

(71) Applicant: TPK Advanced Solutions Inc., Fujian (CN)

(72) Inventors: Yi Peng Gan, Xiamen (CN); Jiang Shan Zheng, Luoyuan County (CN); Kang-Yu Liu, Hsinchu County (TW); Xiao Ping Guo, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/231,174

(22) Filed: Apr. 15, 2021

(51) Int. Cl.
*G06F 3/041* (2006.01)
*G06F 3/044* (2006.01)

(52) U.S. Cl.
CPC .. *G06F 3/0446* (2019.05); *G06F 2203/04103* (2013.01); *G06F 2203/04112* (2013.01)

(58) Field of Classification Search
CPC .... G06F 3/0412; G06F 3/0443; G06F 3/0446; G06F 2203/04103; G06F 2203/04107; G06F 2203/04111; G06F 2203/04112
See application file for complete search history.

(56) References Cited

U.S. PATENT DOCUMENTS

| | | | | |
|---|---|---|---|---|
| 2014/0035599 A1* | 2/2014 | Shimata | ............... | G06F 3/0446 324/658 |
| 2015/0047885 A1* | 2/2015 | Chang | ..................... | H05K 3/20 174/257 |
| 2015/0303398 A1* | 10/2015 | Il | ........................... | H01L 51/442 257/40 |
| 2016/0117032 A1* | 4/2016 | Lin | ..................... | G06F 3/04164 345/173 |
| 2016/0139710 A1* | 5/2016 | Yamai | ..................... | G06F 3/041 345/174 |
| 2018/0366637 A1 | 12/2018 | Pineda et al. | | |
| 2019/0354240 A1* | 11/2019 | Wang | ..................... | G06F 3/0443 |
| 2020/0012372 A1* | 1/2020 | Chang | ..................... | G06F 3/044 |
| 2020/0272260 A1* | 8/2020 | Zhang | ..................... | H05K 1/147 |
| 2021/0089154 A1* | 3/2021 | Wang | ..................... | G06F 3/0412 |

FOREIGN PATENT DOCUMENTS

| | | |
|---|---|---|
| CN | 103492992 A | 1/2014 |
| TW | 201535425 A | 9/2015 |
| TW | 201610772 A | 3/2016 |
| TW | M606594 U | 1/2021 |
| TW | M607109 U | 2/2021 |

* cited by examiner

*Primary Examiner* — Md Saiful A Siddiqui

(74) *Attorney, Agent, or Firm* — Cooper Legal Group, LLC

(57) ABSTRACT

A touch sensor having a visible area and a peripheral area on at least one side of the visible area includes a substrate, a metal nanowire layer, and a metal layer. The metal nanowire layer is disposed on the substrate and has a first portion corresponding to the visible area and a second portion corresponding to the peripheral area. The metal layer is disposed on the substrate and corresponding to the peripheral area, in which a portion of the metal layer overlaps and contacts at least a portion of the second portion of the metal nanowire layer, such that an overlapping region is formed, a contact area of the overlapping region is between 0.09 mm$^2$ and 1.20 mm$^2$, and a contact impedance of the overlapping region is less than 50Ω.

20 Claims, 9 Drawing Sheets

TOUCH SENSOR AND MANUFACTURING METHOD THEREOF

BACKGROUND

Field of Disclosure

The present disclosure relates to a touch sensor and a manufacturing method of a touch sensor.

Description of Related Art

In recent years, touch sensors have been widely used in portable electronic products such as mobile phones, notebook computers, satellite navigation systems, and digital audio-visual players to serve as information communication channels between users and electronic devices.

As demand for narrow bezel electronic products gradually increases, the industry is committed to reducing the size of the bezel of electronic products to meet the needs of users. For touch sensors, it is the size of the periphery area that needs to be reduced. Generally, a touch sensor includes touch electrodes and peripheral circuits, and the touch electrodes and the peripheral circuits are usually overlapped with each other in the peripheral area to form a conductive path or loop. The factors that affect the size of the peripheral area of the touch sensor usually include the overlapping tolerance between the touch electrodes and the peripheral circuits, the contact area between the touch electrodes and the peripheral circuits, and the line width and line spacing of the peripheral circuits. When the size of the peripheral area is reduced by reducing the contact area between the touch electrodes and the peripheral circuits, the contact impedance between the touch electrodes and the peripheral circuits will increase due to the reduction of the contact area, thereby leading to many undesirable effects on the signal transmission of the touch sensor. Based on the above, how to provide a touch sensor which can not only meet the requirements of the narrow bezel design generally recognized by the industry, but also meet the requirements of the contact impedance is currently worth studying.

SUMMARY

According to some embodiments of the present disclosure, a touch sensor having a visible area and a peripheral area on at least one side of the visible area includes a substrate, a metal nanowire layer, and a metal layer. The metal nanowire layer is disposed on the substrate and has a first portion corresponding to the visible area and a second portion corresponding to the peripheral area. The metal layer is disposed on the substrate and corresponding to the peripheral area, in which a portion of the metal layer overlaps and contacts at least a portion of the second portion of the metal nanowire layer, such that an overlapping region is formed, a contact area of the overlapping region is between 0.09 mm$^2$ and 1.20 mm$^2$, and a contact impedance of the overlapping region is less than 50Ω.

In some embodiments of the present disclosure, the contact area is a vertical projection area of the overlapping region on the substrate.

In some embodiments of the present disclosure, the contact area is between 0.09 mm$^2$ and 0.60 mm$^2$.

In some embodiments of the present disclosure, the contact impedance is less than 40 Ω, 30 Ω, 20Ω, or 10Ω.

In some embodiments of the present disclosure, the metal nanowire layer includes a matrix, a plurality of first metal nanowires, and a plurality of second metal nanowires, each of the first metal nanowires is completely embedded in the matrix, and each of the second metal nanowires is partially embedded in the matrix.

In some embodiments of the present disclosure, each of the second metal nanowires in the second portion of the metal nanowire layer has a first portion embedded in the matrix and a second portion protruding from an upper surface of the matrix, and the second portions of the second metal nanowires are embedded in the metal layer.

In some embodiments of the present disclosure, each of the second metal nanowires has a first portion embedded in the matrix and a second portion protruding from an upper surface of the matrix.

In some embodiments of the present disclosure, the metal nanowire layer further includes a plurality of first membrane structures and a plurality of second membrane structures, in which each of the first membrane structures is disposed at an interface between the matrix and each of the first metal nanowires, and each of the second membrane structures is disposed at an interface between the matrix and the first portion of each of the second metal nanowires.

In some embodiments of the present disclosure, each of the first membrane structures covers each of the first metal nanowires to form a first covering structure, and each of the second membrane structures covers the first portion of each of the second metal nanowires to form a second covering structure.

In some embodiments of the present disclosure, a material of each of the first membrane structures and the second membrane structures includes a polyethylene derivative.

In some embodiments of the present disclosure, a material of the metal layer includes a photosensitive silver.

In some embodiments of the present disclosure, the first portion of the metal nanowire layer constitutes a touch sensing electrode, and a second portion of the metal layer constitutes a peripheral circuit.

According to some other embodiments of the present disclosure, a manufacturing method of a touch sensor having a visible area and a peripheral area on at least one side of the visible area includes: providing a substrate; forming a metal nanowire layer on the substrate and corresponding to the visible area and the peripheral area; performing a surface treatment to the metal nanowire layer; and forming a metal layer on the substrate and corresponding to the peripheral area, in which a portion of the metal layer overlaps and contacts the metal nanowire layer which has undergone the surface treatment, such that an overlapping region is formed, a contact area of the overlapping region is between 0.09 mm$^2$ and 1.20 mm$^2$, and a contact impedance of the overlapping region is less than 50Ω.

In some embodiments of the present disclosure, performing the surface treatment to the metal nanowire layer includes: performing a vacuum plasma process to the metal nanowire layer, in which the vacuum plasma process is performed by an argon plasma with a power of 2 kW to 8 kW and a flow rate of 1500 sccm to 2500 sccm, and a time of the vacuum plasma process is between 20 minutes and 30 minutes.

In some embodiments of the present disclosure, the metal nanowire layer includes a matrix, a plurality of metal nanowires, and a plurality of membrane structures, each of the metal nanowires has a first portion embedded in the matrix and a second portion protruding from an upper surface of the matrix, each of the membrane structures covers each of the metal nanowires, and performing the surface treatment to the metal nanowire layer includes:

removing each of the membrane structures covering the second portion of each of the metal nanowires, such that the second portion of each of the metal nanowires is exposed.

In some embodiments of the present disclosure, the metal nanowire layer includes a matrix, a plurality of metal nanowires, and a plurality of membrane structures, the membrane structures are distributed on an upper surface and in an inner portion of the matrix, and performing the surface treatment to the metal nanowire layer includes: removing the membrane structures distributed on the upper surface of the matrix, such that the upper surface of the matrix is exposed.

In some embodiments of the present disclosure, the metal nanowire layer which has undergone the surface treatment includes a matrix and a plurality of metal nanowires, each of the metal nanowires has a first portion embedded in the matrix and a second portion protruding from an upper surface of the matrix, and the metal layer is formed corresponding to the peripheral area such that the second portion of each of the metal nanowires in the peripheral area is embedded in the metal layer.

In some embodiments of the present disclosure, forming the metal nanowire layer on the substrate includes: performing a patterning step to the metal nanowire layer, such that a touch sensing electrode is formed.

In some embodiments of the present disclosure, forming the metal layer on the substrate includes: performing a patterning step to the metal layer, such that a peripheral circuit is formed.

According to the aforementioned embodiments of the present disclosure, the touch sensor of the present disclosure has an overlapping region formed by overlapping a portion of the metal nanowire layer with a portion of the metal layer in the peripheral area. The metal nanowire layer of the present disclosure may undergo a suitable surface treatment, such that the overlapping region formed by the metal layer and the metal nanowire layer can be provided with a good contact effect while having a required contact area. Accordingly, the touch sensor of the present disclosure can not only meet the requirements of the narrow bezel design generally recognized by the industry, but also meet the requirements of the contact impedance.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
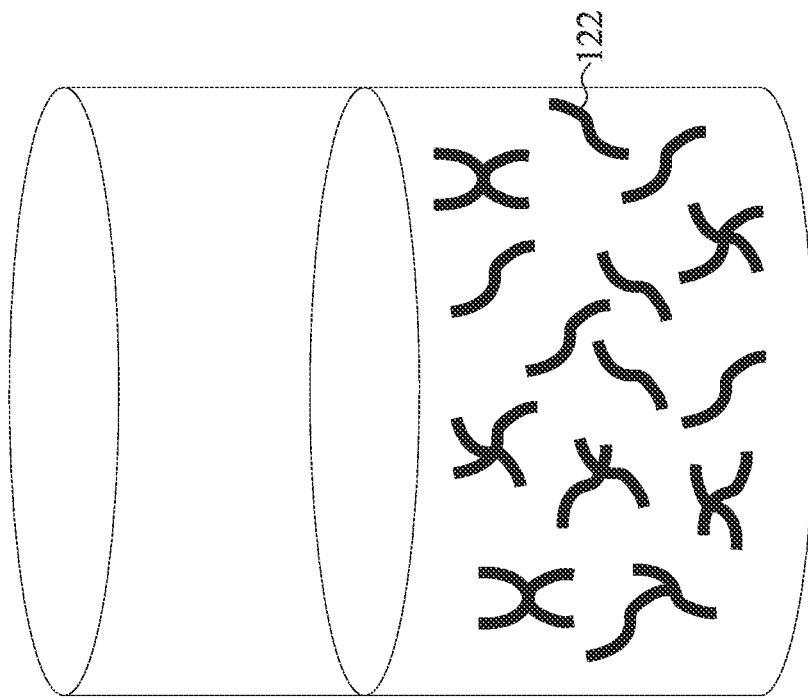
FIG. 1A to FIG. 1E are schematic cross-sectional views illustrating a method of surface treatment to a metal nanowire layer in different steps according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that although the terms "first", "second", and "third" may be used herein to describe various elements, components, regions, layers, and/or portions, and these elements, components, regions, layers, and/or portions should not be restricted by these terms. These terms are only used to distinguish one element, component, region, layer, or portion from another element, component, region, layer, or portion. Therefore, the "first element", "component", "region", "layer", or "portion" described below can also be referred to as a second element, component, region, layer, or portion without departing from the teachings the present disclosure.

In addition, relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

The present disclosure provides a touch sensor which not only meets the requirements of the narrow bezel size generally recognized by the industry, but also meets the requirements of the contact impedance. The present disclosure includes a method of performing a surface treatment to a metal nanowire layer (i.e., a layer including a metal nanowire) and a touch sensor manufactured by the metal nanowire layer which has undergone the surface treatment. It should be understood that the method of performing the surface treatment to the metal nanowire layer will be discussed preferentially in this disclosure for the sake of clarity and convenience of description.

FIG. 1A to FIG. 1E are schematic cross-sectional views illustrating a method of surface treatment to a metal nanowire layer 120 in different steps according to some embodiments of the present disclosure. Reference is made to FIG. 1A. Firstly, a dispersion 10 is provided. In some embodiments, the dispersion 10 may be, for example, a mixture of a solvent, a filler, and a metal nanowire 122, in which the filler and the solvent are uniformly mixed, and the metal nanowire 122 is dispersed in the mixed filler and solvent. In some embodiments, the solvent may be water, alcohols, ketones, ethers, hydrocarbons, aromatic solvents (benzene, toluene, xylene, etc.), or combinations thereof. In some embodiments, the filler may include an insulating material. For example, the insulating material may include nonconductive resin or other organic materials, such as but not limited to, polyacrylate, epoxy resin, polyurethane, polysilane, polysiloxane, polyethylene, polypropylene, polycarbonate, polyvinyl butyral, poly(silicon-acrylic), poly(styrene sulfonic acid), acrylonitrile-butadiene-styrene copolymer, poly(3,4-ethylenedioxythiophene), ceramic materials, or combinations thereof. In some embodiments, the metal nanowire 122 may be, for example, but not limitation, a silver nanowire, a gold nanowire, a copper nanowire, a nickel nanowire, or combinations thereof.

It should be understood that the term "metal nanowire" used herein is a collective noun, which refers to a collection of metal wires that include multiple metal elements, metal alloys, or metal compounds (including metal oxides), and the number of metal nanowires included therein does not affect the scope of the present disclosure. In some embodiments, a cross-sectional size (e.g., a diameter of the cross section) of a single metal nanowire can be less than 500 nm, preferably less than 100 nm, and more preferably less than 50 nm. In some embodiments, the metal nanowire has a large aspect ratio (i.e., length:diameter of the cross section). Specifically, the aspect ratio of the metal nanowire may be between 10 and 100,000. In more detail, the aspect ratio of the metal nanowire may be greater than 10, preferably greater than 50, and more preferably greater than 100. Moreover, other terms such as silk, fiber, or tube also have the aforementioned cross-sectional dimensions and aspect ratios, which also fall within the scope of the present disclosure.

In some embodiments, the dispersion 10 may include a polymer binder for improving the compatibility between the metal nanowires 122, the solvent, and the filler as well as the stability of the metal nanowires 122 in the solvent and filler. In some embodiments, the polymer binder may include polyethylene derivatives, such as polyvinylpyrrolidone (PVP). In some embodiments, the dispersion 10 may further include additives and/or surfactants. Specifically, the additives and/or surfactants may be, for example, carboxymethyl cellulose, hydroxyethyl cellulose, hypromellose, fluorosurfactant, sulfosuccinate sulfonate, sulfate, phosphate, disulfonate, or combinations thereof.

Figure 1B:
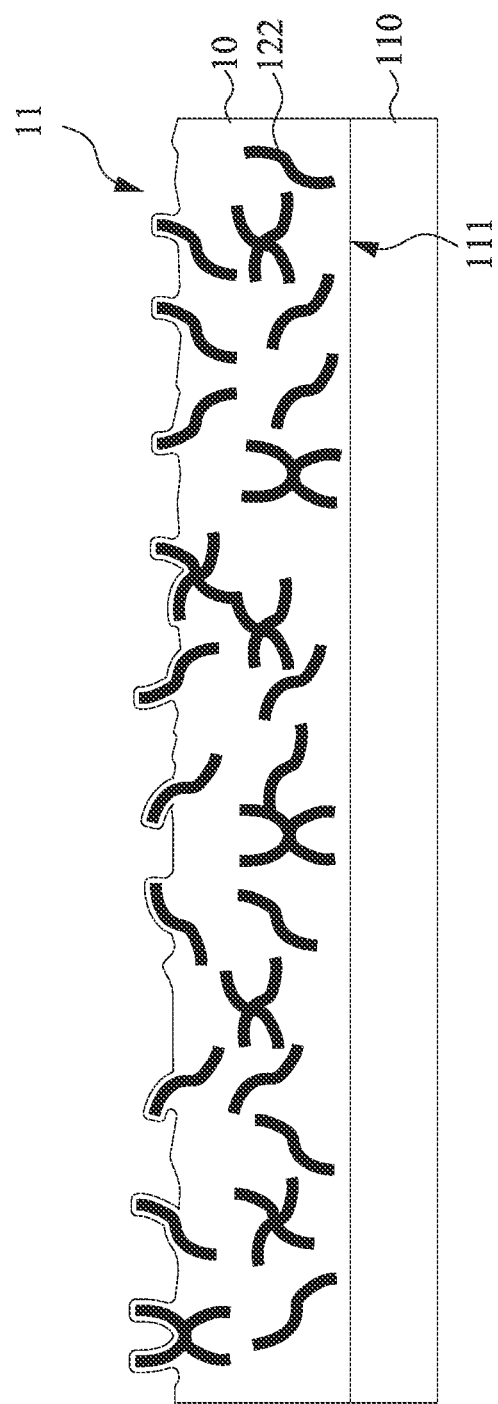

Reference is made to FIG. 1B. Next, a substrate 110 is provided, and the dispersion 10 including the metal nanowires 122 is coated on a surface 111 of the substrate 110. When viewed on a microscopic scale, the metal nanowires 122 are randomly distributed in the dispersion 10 without directionality, and some of the metal nanowires 122 are distributed near a liquid surface 11 of the dispersion 10, such that the liquid surface 11 of the dispersion 10 is uneven and undulating. In some embodiments, the metal nanowires 122 can contact each other to provide a continuous current path, so as to form a conductive network. That is, the metal nanowires 122 contact each other at their intersection positions to form a path for transferring electrons. Taking silver nanowires as an example, one silver nanowire and another silver nanowire form a direct contact at their intersection position, such that a low-resistance path for transferring electrons can be formed. Further, the dispersion 10 coated on the surface 111 of the substrate 110 can completely cover each metal nanowire 122 in the dispersion 10, and the solvent and filler in the dispersion 10 are uniformly mixed without generation of aggregates or precipitates during and after coating.

Figure 1C:
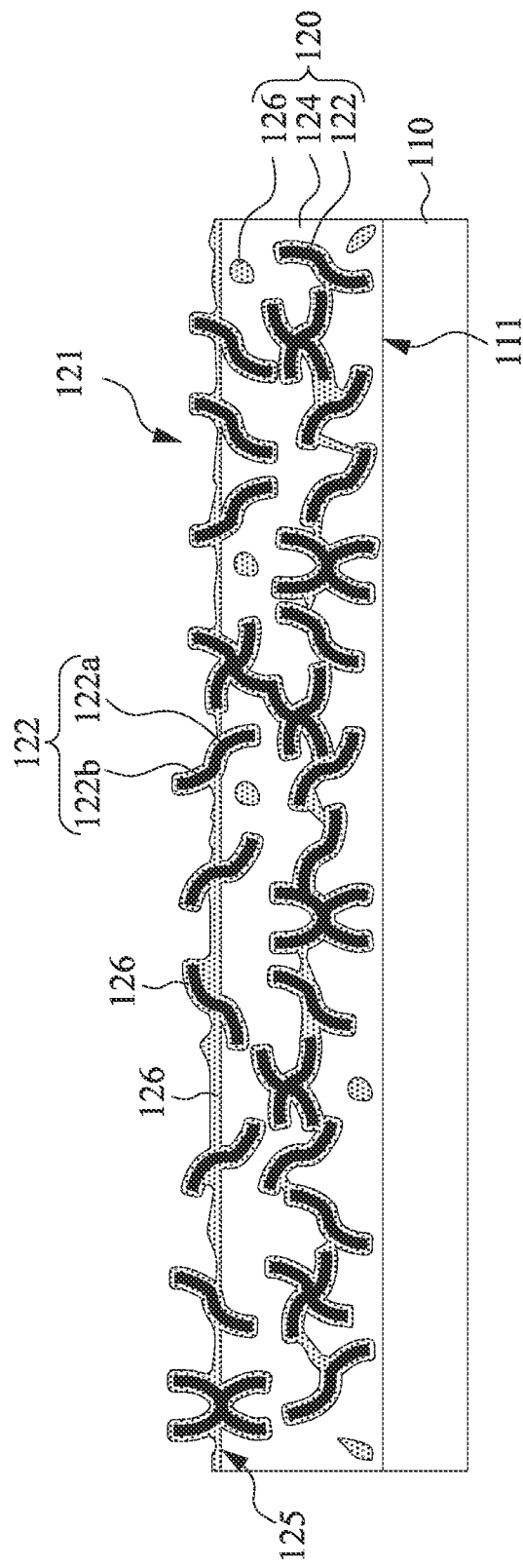

Reference is made to FIG. 1C. Then, a curing/drying step is performed to completely cure the dispersion 10 coated on the surface 111 of the substrate 110 by light, heat, or other methods, thereby forming a metal nanowire layer 120. In detail, after the curing/drying step, the solvent in the dispersion 10 volatilizes, the filler is cured to form a matrix 124, and the metal nanowires 122 can be distributed in the matrix 124 in a random manner. In some embodiments, the polymer binder in the dispersion 10 is also cured to form a plurality of membrane structures 126 in the metal nanowire layer 120. In more detail, before the curing/drying step, a portion of the polymer binder may be in an inner portion of the dispersion 10, and a portion of the polymer binder may be in an upper layer (portion) of the dispersion 10; therefore, after the curing/drying step, some of the membrane structures 126 can be formed in an inner portion of the matrix 124, and some of the membrane structures 126 can be formed on an upper surface 125 of the matrix 124. In some embodiments, the membrane structures 126 in the inner portion of the matrix 124 can, for example, be distributed in the matrix 124 in a random manner, and the membrane structures 126 on the upper surface 125 of the matrix 124 can, for example, cover the upper surface 125 of the matrix 124 in its entirety to form a film layer 126.

In some embodiments, the polymer binder in the inner portion of the dispersion 10 can further be cured along the surfaces of the metal nanowires 122 during the curing/drying step. As such, some of the membrane structures 126 can be formed at an interface between the metal nanowire 122 and the matrix 124, and some of the membrane structures 126 can exist alone between the adjacent metal nanowires 122 in the matrix 124. In some embodiments, the membrane structure 126 can cover each of the metal nanowires 122 to form a covering structure 126. In some embodiments, the covering structure 126 may, for example, cover a portion of a surface of each of the metal nanowires 122. In some other embodiments, the covering structure 126 may, for example, cover the entire surface of each of the metal nanowires 122. In some embodiments, a coverage rate of the covering structure 126 may be more than about 80%, about 90% to about 95%, about 90% to about 99%, or about 90% to 100% of the total surface area of the metal nanowire 122. It should be understood that when the coverage rate of the covering structure 126 is said to be 100%, it means that the entire surface of the metal nanowire 122 is not exposed. It is worth noting that since the metal nanowires 122 of the present disclosure can contact each other to form a conductive network, the covering structure 126 is substantially continuously formed on the entire surface of the metal nanowires 122 that are in contact with each other, so as to cover the entire conductive network, and will not affect the contact between the metal nanowires 122. In some embodiments, the covering structure 126 may, for example, cover the surface of each of the metal nanowires 122 in a conformal manner.

For the metal nanowires 122 near an upper surface 121 of the metal nanowire layer 120, each of the metal nanowires 122 has a first portion 122a embedded in the matrix 124 and a second portion 122b protruding from the upper surface 125 of the matrix 124, and the surface of each of the metal nanowires 122 is covered by the covering structure 126. In other words, the covering structure 126 covering the first portion 122a of the metal nanowire 122 is disposed at the interface between the matrix 124 and the metal nanowire 122 (i.e., the matrix 124 and the first portion 122a of the metal nanowire 122 are spaced apart from each other by the covering structure 126), and the covering structure 126 covering the second portion 122b of the metal nanowire 122 is exposed outside the matrix 124. When the metal nanowire layer 120 is viewed as a whole, the metal nanowire layer 120 may include the matrix 124, the metal nanowires 122, and the membrane structures 126. The membrane structures 126 can exist alone in the inner portion of the matrix 124, cover the upper surface 125 of the matrix 124 to form the film layer 126, or cover each of the metal nanowires 122 to form the covering structures 126, and a material of the membrane structures 126 may include polyethylene derivatives, such as polyvinylpyrrolidone.

Figure 1D:
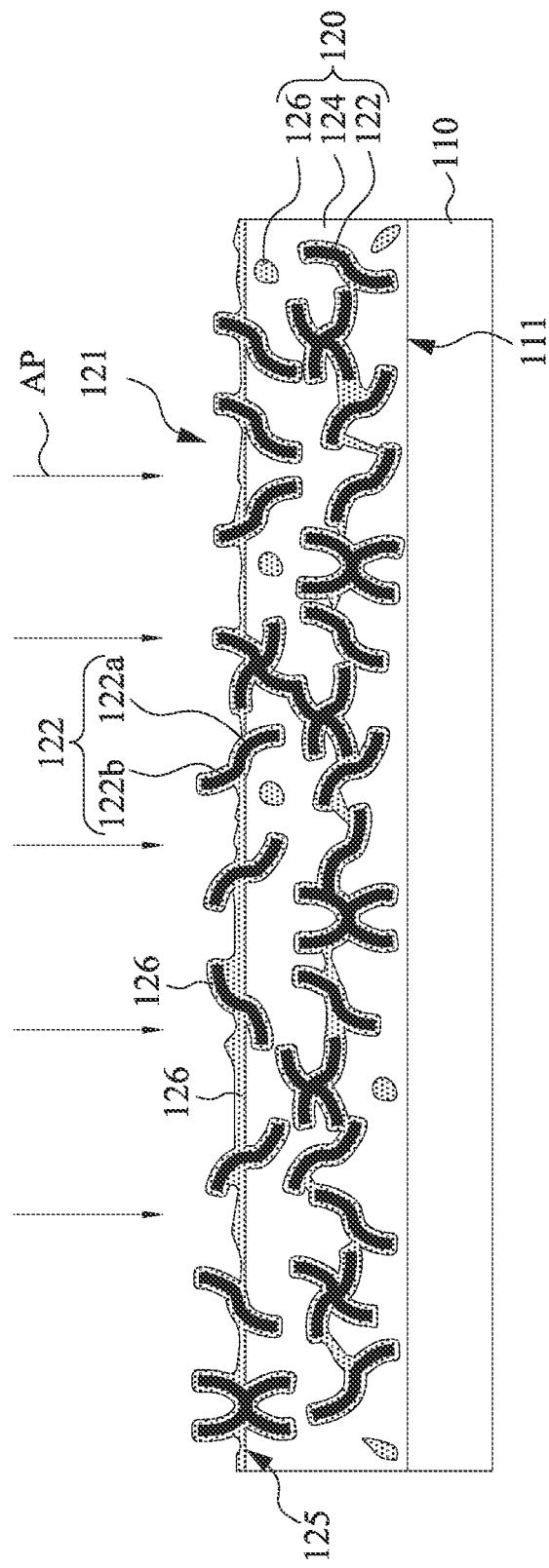
Figure 1E:
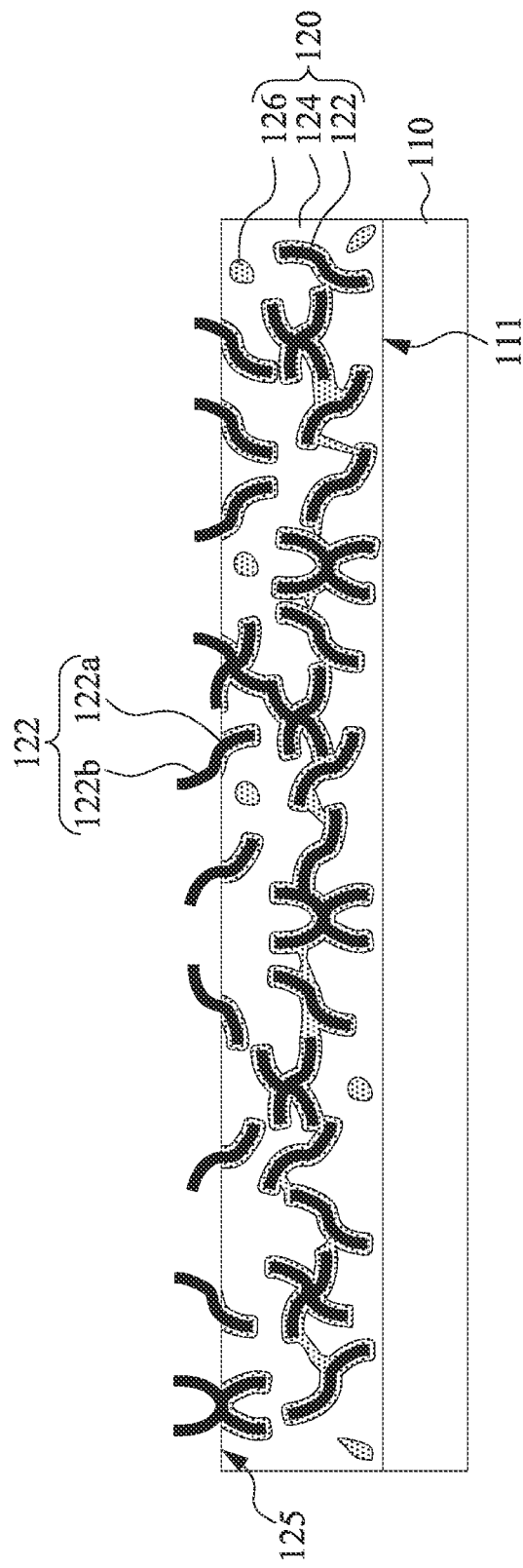

Reference is made to FIG. 1D. Subsequently, the metal nanowire layer 120 being cured/dried may undergo a surface treatment. The metal nanowire layer 120 which has undergone the surface treatment can have a lower surface resistance, so as to electrically overlap with other conductive layers (e.g., a metal layer, of which the specific structure will be described in detail below). Regarding the method of the surface treatment, for example, after the metal nanowire layer 120 is formed, a vacuum plasma process can be performed to the metal nanowire layer 120 to remove the membrane structures (film layer) 126 on the upper surface 125 of the matrix 124 and the membrane structures (covering structures) 126 covering the second portions 122b of the metal nanowires 122, such that the upper surface 125 of the matrix 124 and the second portion 122b of the metal nanowire 122 are exposed. In some embodiments, the surface treatment is performed by carry out the vacuum plasma process by an argon plasma (AP) with a power of 2 kW to 8 kW and a flow rate of 1500 sccm to 2500 sccm (preferably a flow rate of 1900 sccm to 2100 sccm) to the metal nanowire layer 120 for 20 minutes to 30 minutes. The metal nanowire layer 120 which has undergone the surface treatment is shown in FIG. 1E, in which the membrane structures (film layer) 126 on the upper surface 125 of the matrix 124 and the membrane structures (covering structures) 126 covering the second portions 122b of the metal nanowires 122 are removed, leaving the membrane structures 126 in the matrix 124 (including the membrane structures (covering structures) 126 covering the metal nanowires 122 and the membrane structures 126 existing alone in the matrix 124). Since the second portions 122b of the metal nanowires 122 near the upper surface 125 of the matrix 124 can be completely exposed without being covered by the membrane structures 126 after the surface treatment, the metal nanowire layer 120 which has undergone the surface treatment has a lower surface resistance, in which the surface resistance can be reduced by about 5% to about 10% compared to the surface resistance of the metal nanowire layer 120 which has not undergone the surface treatment. As such, the metal nanowire layer 120 can have a lower overlapping impendence when being overlapped with other conductive layers formed subsequently.

Figure 2A:
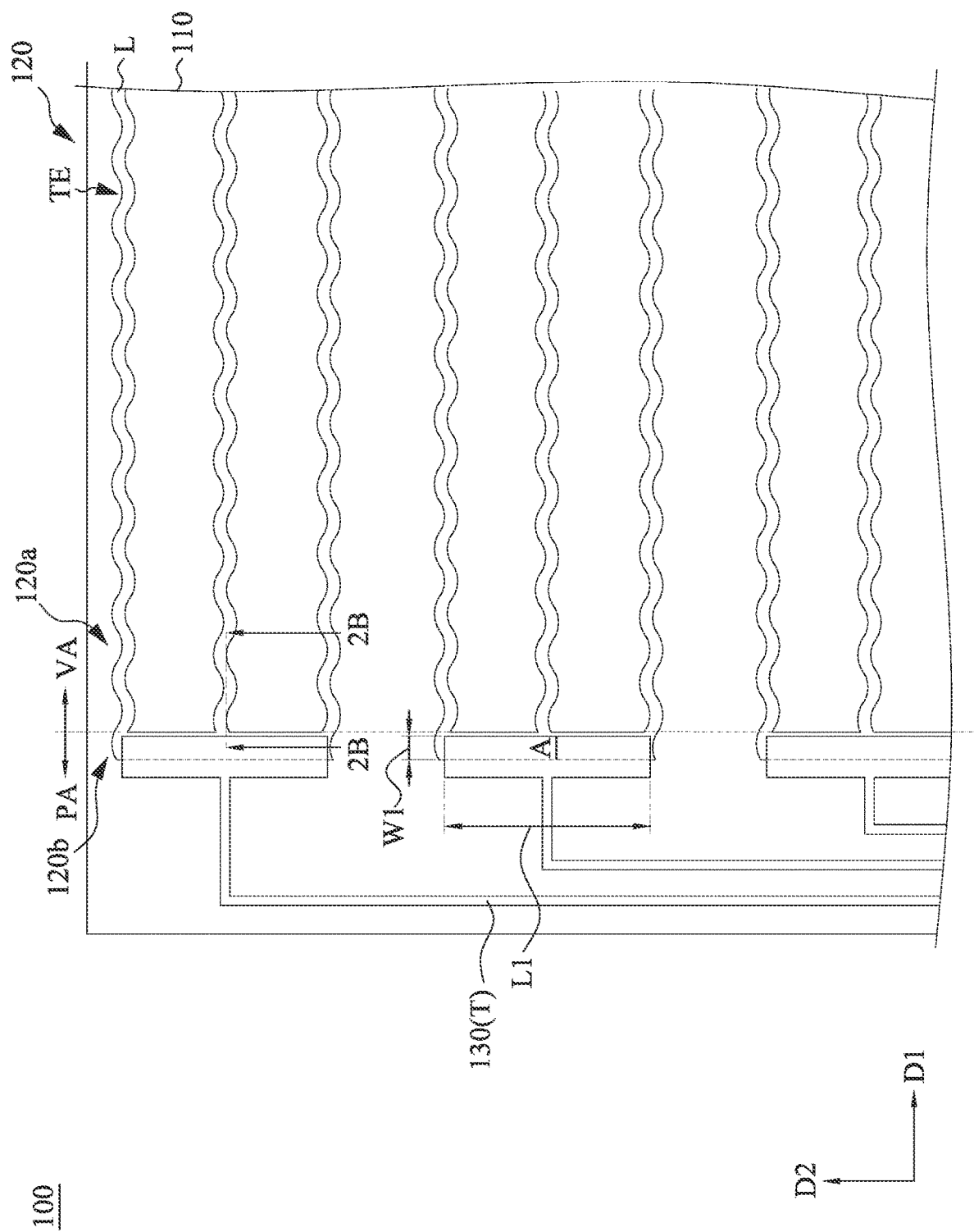
FIG. 2A is a schematic top view illustrating a touch sensor according to some embodiments of the present disclosure.
Figure 2B:
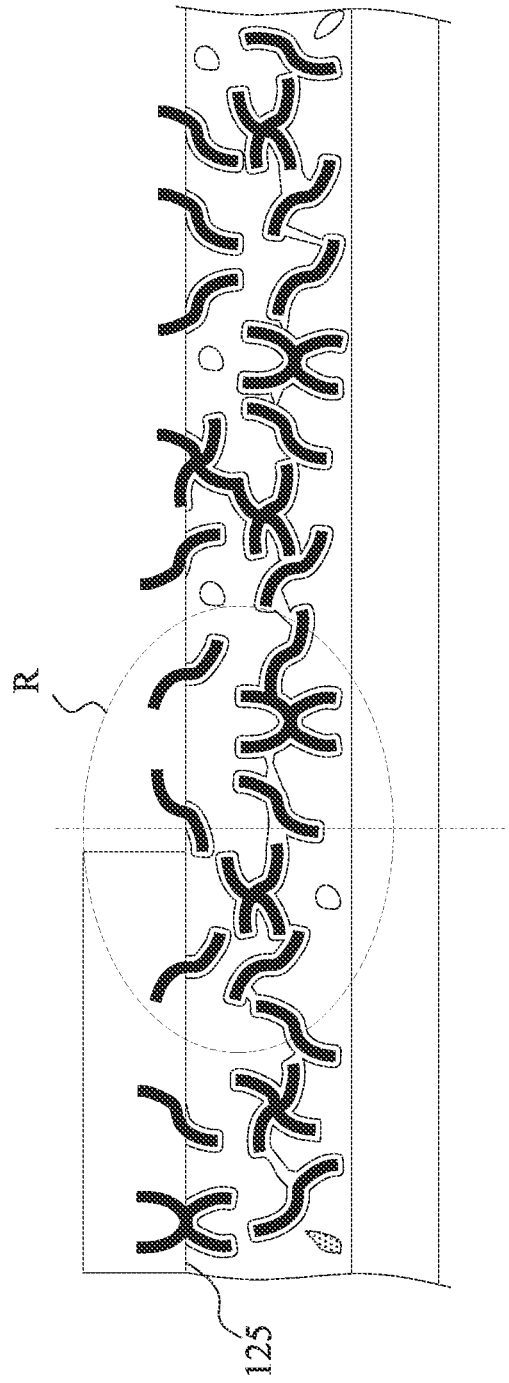
FIG. 2B is a schematic cross-sectional view illustrating the touch sensor in FIG. 2A taken along the line 2B-2B according to some embodiments of the present disclosure.

The aforementioned method of the present disclosure can be applied to the manufacture a touch sensor. Specifically, reference is made to FIG. 2A and FIG. 2B, in which FIG. 2A is a schematic top view illustrating a touch sensor 100 according to some embodiments of the present disclosure, and FIG. 2B is a schematic cross-sectional view illustrating the touch sensor 100 in FIG. 2A taken along the line 2B-2B according to some embodiments of the present disclosure. In some embodiments, the touch sensor 100 may include a substrate 110, a metal nanowire layer 120, and a metal layer 130. The substrate 110 is configured to carry the metal nanowire layer 120 and the metal layer 130, and may be, for example, a rigid transparent substrate or a flexible transparent substrate. In some embodiments, a material of the substrate 110 includes, but is not limited to, transparent materials such as glass, acrylic, polyvinyl chloride, cycloolefin polymer, cycloolefin copolymer, polypropylene, polystyrene, polycarbonate, polyethylene terephthalate, polyethylene naphthalate, colorless polyimide, or combinations thereof. In some embodiments, the touch sensor 100 has a visible area VA and a peripheral area PA, and the peripheral area PA is disposed on the sides of the visible area VA. For example, the peripheral area PA may be a frame-shaped area disposed around (i.e., including the right, left, upper, and lower sides of) the visible area VA. As another example, the peripheral area PA may be an L-shaped area disposed on the left and lower sides of the visible area VA.

In some embodiments, the metal nanowire layer 120 and the metal layer 130 are sequentially disposed on the substrate 110 and in the peripheral area PA, and a portion of the metal layer 130 overlaps and contacts a portion of the metal nanowire layer 120 to form an overlapping region A. More specifically, the metal nanowire layer 120 has a first portion 120a in the visible area VA and a second portion 120b in the peripheral area PA. The first portion 120a of the metal nanowire layer 120 constitutes a touch sensing electrode TE, and at least a portion of the second portion 120b of the metal nanowire layer 120 overlaps and contacts the metal layer 130 which is located in the peripheral area PA and constitutes the peripheral circuit T, so as to form the overlapping region A. Through the overlap between the metal layer 130 and the metal nanowire layer 120, an electron transmission path across the visible area VA and the peripheral area PA for touch control or other signal transmission can be formed in the touch sensor 100. It is noted that the metal nanowire layer 120 and the metal layer 130 described in the present disclosure are merely used for the convenience of describing the laminated structure. In fact, the metal nanowire layer 120 may be patterned to include at least one touch sensing electrode TE, the metal layer 130 may be patterned to include at least one peripheral circuit T corresponding to the touch sensing electrode TE, and the overlapping region A of the present disclosure refers to a region formed by one peripheral circuit T and one touch sensing electrode TE being in contact with each other.

In some embodiments, one touch sensing electrode TE may include a plurality of strip-shaped electrode lines L extending along a first direction D1, such as the three electrode lines L shown in FIG. 2A, and the electrode lines L may be arranged at intervals along the second direction D2 and connected in parallel, in which the first direction D1 is perpendicular to the second direction D2. In this embodiment, the touch sensing electrode TE has a wave-shaped electrode pattern. However, the shape and arrangement of the touch sensing electrode TE are not limited thereto. In some other embodiments, the touch sensing electrode TE may also be provided with other appropriate shapes and arrangements.

Figure 2C:
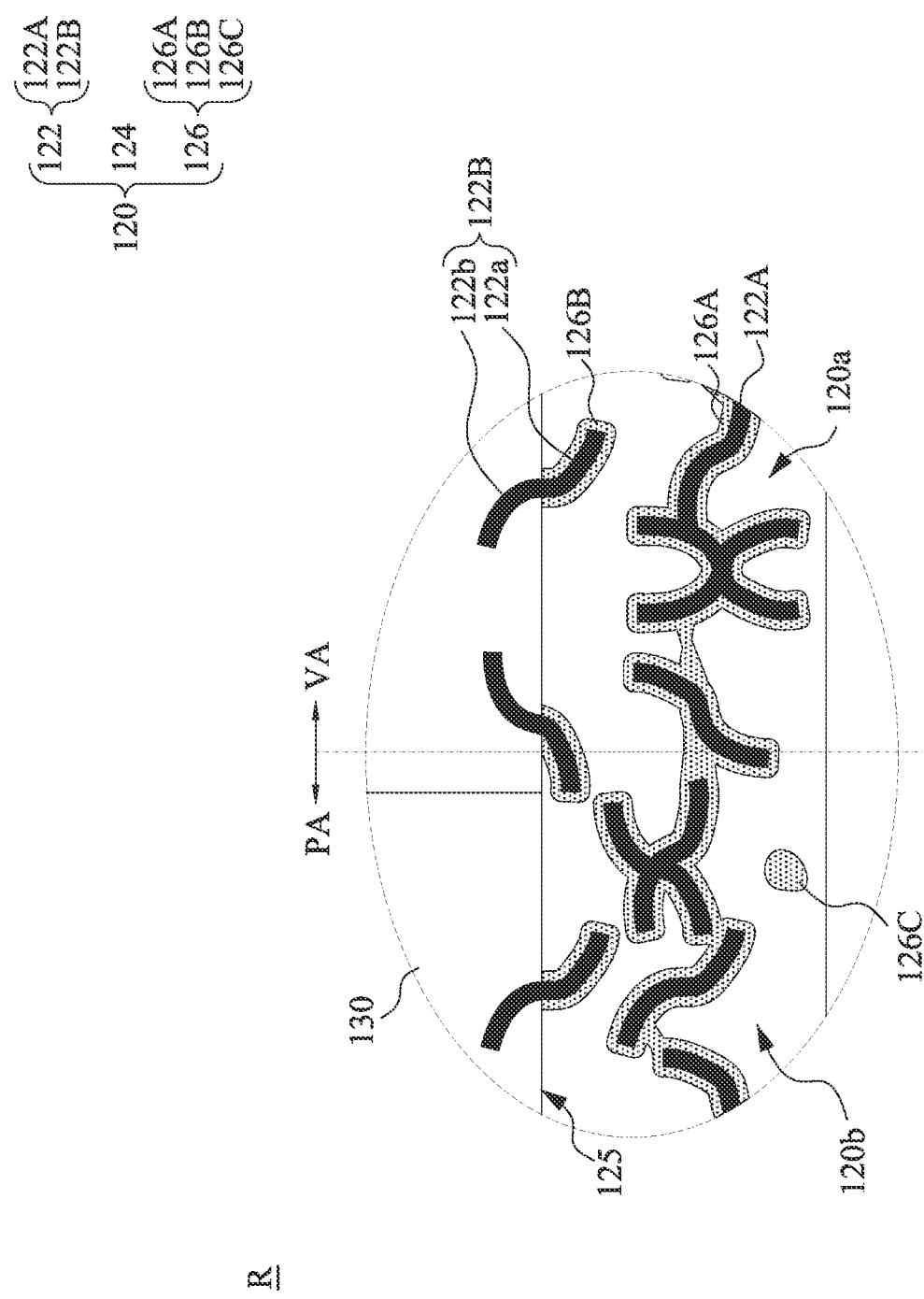
FIG. 2C is a schematic partial enlargement view illustrating the region R of the touch sensor in FIG. 2B according to some embodiments of the present disclosure.

FIG. 2C is a schematic partial enlargement view illustrating the region R of the touch sensor 100 in FIG. 2B according to some embodiments of the present disclosure. Reference is made to FIG. 2B and FIG. 2C. In some embodiments, the metal nanowire layer 120 is a metal nanowire layer 120 which has undergone the surface treatment. In more detail, the metal nanowire layer 120 may include the matrix 124, a plurality of first metal nanowires 122A, and a plurality of second metal nanowires 122B, in which the first metal nanowires 122A are completely embedded in the matrix 124, the second metal nanowires 122B are near the upper surface 125 of the matrix 124 and partially embedded in the matrix 124, and each of the second metal nanowire 122B has a first portion 122a embedded in the matrix 124 and a second portion 122b protruding from the upper surface 125 of the matrix 124. In addition, an interface between the matrix 124 and each of the first metal nanowires 122A has a first membrane structure 126A (i.e., the matrix 124 and each of the first metal nanowires 122A are spaced apart from each other by the first membrane structure 126A), and an interface between the matrix 124 and the first portion 122a of each of the second metal nanowires 122B has a second membrane structure 126B (i.e., the matrix 124 and the first portion 122a of each of the second metal nanowires 122B are spaced apart from each other by the second membrane structure 126B). When viewed from the first portion 120a of the metal nanowire layer 120 in the visible area VA, the second portions 122b of the second metal nanowires 122B are exposed from the upper surface 125 of the matrix 124; when viewed from the second portion 120b of the metal nanowire layer 120 in the peripheral area PA, the second portions 122b of the second metal nanowires 122B are embedded in the metal layer 130 above the metal nanowire layer 120.

In some embodiments, the first membrane structure 126A may further cover a portion or an entire surface of each of the first metal nanowires 122A to form a first covering structure 126A, and the second membrane structure 126B may also cover a portion or an entire surface of the first portion 122a of each of the second metal nanowires 122B to form a second covering structure 126B. In some embodiments, the metal nanowire layer 120 may further include a plurality of third membrane structures 126C existing alone in the matrix 124 between the first metal nanowires 122A, between the second metal nanowires 122B, and between the first metal nanowires 122A and the second metal nanowires 122B. In other words, the third membrane structures 126C are not in contact with any of the first metal nanowires 122A or the second metal nanowires 122B.

The surface resistance of the metal nanowire layer 120 can be effectively reduced by carrying out the vacuum plasma process described above to perform the surface treatment to the metal nanowire layer 120 for removing the membrane structures 126 covering the second portions 122b of the second metal nanowires 122B and making the second portions 122b of the second metal nanowires 122B be exposed. Moreover, when the metal layer 130 is overlapped with the metal nanowire layer 120, since the exposed portions of the second metal nanowires 122B in the metal nanowire layer 120 can directly contact the metal layer 130, a lower contact impedance is formed between the metal nanowire layer 120 and the metal layer 130, thereby meeting the requirements of the contact impedance. Furthermore, the size of the peripheral area PA of the touch sensor 100 (e.g., the width of the peripheral area PA) can be designed to be within a smaller size range due to the reduction in the contact impedance, so as to meet the specifications of the narrow bezel size generally recognized by the industry.

Specifically, in the touch sensor 100 of the present disclosure, a portion of the metal layer 130 in the peripheral area PA overlaps at least a portion of the second portion 120b of the metal nanowire layer 120 which has undergone the surface treatment, in which the formed overlapping region A may have a contact area between 0.09 $mm^2$ and 1.20 $mm^2$, and the contact impedance of the overlapping region A is less than 50Ω, preferably less than 40 Ω, 30Ω, or 20Ω, and more preferably less than 10Ω. Generally, when the contact area of the overlapping region A is less than or equal to 1.20 $mm^2$, the design of the peripheral area PA of the touch sensor 100 can be flexible, and the size of the peripheral area PA can be relatively small, such that the touch sensor 100 meets the specifications of the narrow bezel size generally recognized by the industry. In other words, the touch sensor 100 of the present disclosure can simultaneously meet the specifications of the narrow bezel size generally recognized by the industry and the requirements of the contact impedance. In detail, if the contact area of the overlapping region A is greater than 1.20 $mm^2$, the size of the peripheral area PA of the touch sensor 100 needs to be increased accordingly, such that the touch sensor 100 cannot meet the specifications of the narrow bezel size generally recognized by the industry; if the contact area of the overlapping region A is less than 0.09 $mm^2$, the contact impedance of the overlapping region A will be too high (e.g., higher than 50Ω), resulting in the failure of the touch sensor 100 to meet the requirements of the contact impedance. In addition, the contact area being less than 0.09 $mm^2$ will also result in the failure to form an effective and reliable overlap in the structure, and the metal layer 130 and the metal nanowire layer 120 will easily peel off and be separated. In some other embodiments, for a smaller-sized product (e.g., a wearable device such as a watch), the overlapping region A of the touch sensor 100 may further have a contact area between 0.09 $mm^2$ and 0.6 $mm^2$, and the contact impedance of the overlapping region A is less than 50Ω, preferably less than 40 Ω, 30Ω, or 20Ω, and more preferably less than 10Ω, so as to meet the specifications of the narrow bezel size generally recognized by the industry. It should be understood that the shape of the overlapping region A mentioned in this disclosure is exemplified by a quadrilateral that is commonly designed in the art, and the "contact area" refers to an area of a plane region formed by a length L1 and a width W1 of the overlapping region A when viewed from the top angle (the viewing angle of FIG. 2A), in which the plane region falls on a plane formed by the first direction D1 and the second direction D2. More specifically, the "contact area" refers to the vertical projection area of the overlapping region A on the substrate 110, which is the area that actually affects the size of the peripheral area PA of the touch sensor 100.

Figure 3:
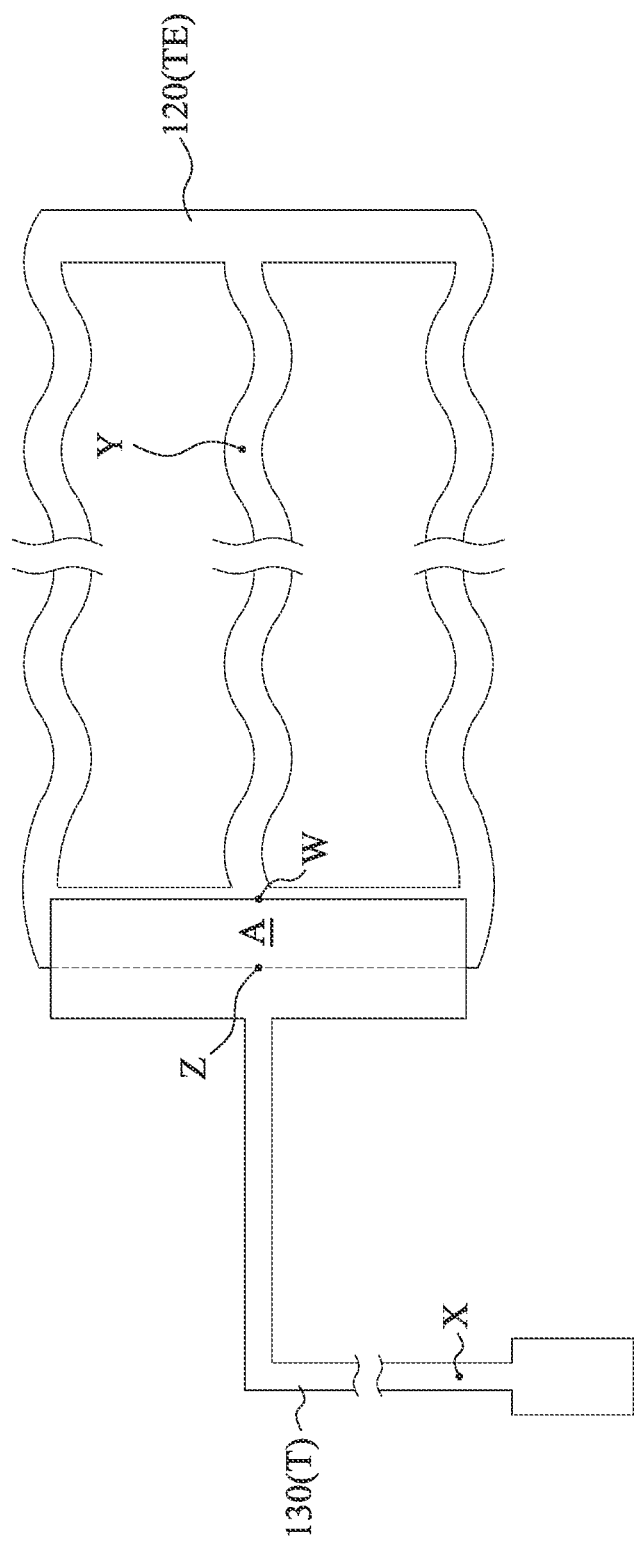
FIG. 3 is a schematic view illustrating a measurement method of the contact impedance of the overlapping region.

Reference is made to Table 1, which specifically presents the contact impedance of the overlapping region A through each comparative example and embodiment, in which the overlapping region A is formed by overlapping the metal nanowire layer 120 before and after the surface treatment with the metal layer 130. Specifically, the metal nanowire layer 120 in each comparative example has not undergone the surface treatment, and the metal nanowire layer 120 in each embodiment has undergone the surface treatment through the steps described above, in which the metal nanowire layer 120 in each embodiment has undergone the vacuum plasma process for 26 minutes by the argon plasma with a power of 6 kW and a flow rate of 2000 sccm. In addition, the measurement of the overlapping region A in each comparative example and embodiment is carried out using a structure constituted by one touch sensing electrode TE overlapping one corresponding peripheral circuit T. Reference is made to FIG. 3 for a measurement method of the contact impedance of the overlapping region A in each comparative example and embodiment, in which FIG. 3 is a schematic view illustrating a measurement method of the contact impedance of the overlapping region A. The measurement equipment is the Keysight® B2912A type power measurement equipment with probes, and the measurement is carried out under a normal temperature environment. During the measurement, a constant input current (10 μA) is provided to each measurement section (e.g., the X-Y section, the X-Z section, and the W-Y section), such that an output voltage is measured and further be converted into resistance impedance by Ohm's law.

Specifically, the measurement method of the contact impedance of the overlapping region A includes the following steps. Step 1: placing a first probe of the power measurement equipment to contact any position (point X) of the peripheral circuit T, and placing a second probe to contact any position (point Y) of the touch sensing electrode TE, such that impedance$_{(X-Y)}$ is obtained. Step 2: keeping the first probe contacting the point X of the peripheral circuit T, and moving the second probe to contact the peripheral circuit T at an edge of the overlapping region A (point Z), such that impedance$_{(X-Z)}$ is obtained. Step 3: placing the first probe of the power measurement equipment to contact the point Y of the touch sensing electrode TE, and placing the second probe to contact the touch sensing electrode TE at an edge of the overlapping region A (point W), such that impedance$_{(W-Y)}$ is obtained. After respectively obtaining the impedance$_{(X-Y)}$, impedance$_{(X-Z)}$, and impedance$_{(W-Y)}$, the contact impedance of the overlapping region A (i.e., impedance$_{(W-Z)}$) can be obtained by the formula: [impedance$_{(X-Y)}$−impedance$_{(X-Z)}$−impedance$_{(W-Y)}$]=impedance$_{(W-Z)}$. Other detailed descriptions and measurement results of the overlapping region A of each comparative example and embodiment are shown in Table 1.

TABLE 1

| contact area (mm²) (width W1 * length L1) | comparative example impedance$_{(W-Z)}$ (Ω) | embodiment impedance$_{(W-Z)}$ (Ω) |
|---|---|---|
| 1.60 (0.40 * 4) | 18 | 1 |
| 1.20 (0.40 * 3) | 57 | 1 |
| 0.80 (0.20 * 4) | 56 | 1 |
| 0.60 (0.20 * 3) | 57 | 1 |
| 0.40 (0.10 * 4) | 70 | 1 |
| 0.30 (0.10 * 3) | 65 | 1 |
| 0.20 (0.05 * 4) | 51 | 1 |
| 0.15 (0.05 * 3) | 69 | 3 |
| 0.12 (0.03 * 4) | 60 | 3 |
| 0.09 (0.03 * 3) | 76 | 4 |

Note:
When the measurement result of the impedance is less than 1 Ω, the impedance is recorded as 1 Ω.

It can be seen from the measurement results in Table 1 that when the overlapping region A formed by overlapping the metal nanowire layer 120 which has not undergone the surface treatment with the metal layer 130 has a small contact area (e.g., a contact area from 0.09 mm² to 1.20 mm²), the contact impedance is greater than 50Ω. In contrast, when the overlapping region A formed by overlapping the metal nanowire layer 120 which has undergone the surface treatment and the metal layer 130 has a small contact area (e.g., a contact area from 0.09 mm² to 1.20 mm²), the contact impedance is less than 50Ω (or the contact impedance can even be less than or equal to 1Ω). In other words, the touch sensor 100 of the present disclosure can still meet the requirements of low contact impedance while meeting the specifications of the narrow bezel size generally recognized by the industry. It is worth noting that when the contact area of the overlapping region A is greater than 1.2 mm² (e.g., the contact area of 1.6 mm² in Table 1), although the contact impedance can still be less than 50Ω without the surface treatment to the metal nanowire layer 120, the touch sensor 100 having the overlapping region A with the contact area larger than 1.2 mm² cannot meet the specifications of narrow bezel size generally recognized by the industry.

Reference is made to Table 2, which specifically presents the measurement results under a normal temperature environment through each comparative example and embodiment of the overlapping region A formed by overlapping the metal nanowire layer 120 before and after the surface treatment with the metal layer 130, in which the overlapping region A is placed under a high temperature and high humidity environment, and the high temperature and high humidity environment is the HS6590 environment (i.e., a temperature of 65° C. and a relative humidity of 90%). Specifically, the metal nanowire layer 120 in each comparative example has not undergone the surface treatment, and the metal nanowire layer 120 in each embodiment has undergone the surface treatment through the steps described above, in which the metal nanowire layer 120 in each embodiment has undergone the vacuum plasma process for 26 minutes by the argon plasma with a flow rate of 2000 sccm. In addition, the measurement method and the measurement equipment applied under the normal temperature environment are identical to the measurement method and the measurement equipment in the foregoing descriptions of Table 1. Other detailed descriptions and measurement results of the overlapping region A of each comparative example and embodiment are shown in Table 2.

TABLE 2

| | contact area (mm²) (width W1 * length L1) | parameters of surface treatment (power of vacuum plasma process) | time experienced under HS6590 environment | | | | |
|---|---|---|---|---|---|---|---|
| | | | 0 hr. | 24 hr. | 48 hr. | 72 hr. | 120 hr. |
| | | | contact impedance under normal temperature environment | | | | |
| comparative example | 1.20 (0.40 * 3) 0.80 (0.20 * 4) 0.60 (0.20 * 3) 0.40 (0.10 * 4) 0.30 (0.10 * 3) 0.20 (0.05 * 4) 0.15 (0.05 * 3) 0.12 (0.03 * 4) 0.09 (0.03 * 3) | without the surface treatment | >50Ω | N/A | N/A | N/A | N/A |
| embodiment | 1.20 (0.40 * 3) 0.80 (0.20 * 4) 0.60 (0.20 * 3) 0.40 (0.10 * 4) | 3.5 kW | <50Ω | | | | |
| | 0.30 (0.10 * 3) 0.20 (0.05 * 4) | 6.0 kW | <50Ω | | | | |
| | 0.15 (0.05 * 3) 0.12 (0.03 * 4) 0.09 (0.03 * 3) | 8.0 kW | <50Ω | | | | |

It can be seen from the measurement results in Table 2 that when the contact area of the overlapping region A is between 0.09 mm² and 1.20 mm², the touch sensor 100 formed by overlapping the metal nanowire layer 120 which has not undergone the surface treatment with the metal layer 130 cannot have a contact impedance less than 50Ω) even before being placed under a high temperature and high humidity environment. In contrast, the touch sensor 100 formed by overlapping the metal nanowire layer 120 undergone the surface treatment and the metal layer 130 can still have a contact impedance less than 50Ω) under a normal temperature environment after being placed under a high temperature and high humidity environment for 120 hours. The measurement result shows that the touch sensor 100 having the metal nanowire layer 120 which has undergone the surface treatment can still meet the requirements of low contact impedance after being placed under a high temperature and high humidity environment while meeting the specifications of the narrow bezel size generally recognized by the industry.

Incidentally, if the touch sensor 100 has a plurality of the touch sensing electrodes TE, in the touch sensor 100 of the present disclosure formed by overlapping the metal nanowire layer 120 which has undergone the surface treatment and the metal layer 130, the difference between the contact impedance corresponding to different touch sensing electrodes TE can be maintained within ±2.5Ω. On the other hand, in the touch sensor 100 formed by overlapping the metal nanowire layer 120 which has not undergone the surface treatment with the metal layer 130, the difference between the contact impedance corresponding to different touch sensing electrodes TE may reach up to ±30Ω. Accordingly, the touch sensor 100 of the present disclosure not only provides lower contact impedance, but also provide better uniformity between the contact impedance of the different touch sensing electrodes TE.

In the following description, the metal nanowire layer 120 which has undergone the surface treatment and formed on the substrate 110 as shown in FIGS. 1A to 1E and the touch sensor 100 shown in FIGS. 2A to 2C will be taken as an example to further describe the manufacturing method of the touch sensor 100 of the present disclosure. It should be understood that the component configuration, connection relationships, and advantages which have been described in the foregoing will not be repeated hereinafter.

The manufacturing method of the touch sensor 100 may include step S10 to step S40, and step S10 to step S40 may be performed sequentially. In step S10, the substrate 110 is provided. In step S20, the metal nanowire layer 120 is formed on the substrate 110 and corresponding to the visible area VA and the peripheral area PA. In step S30, the metal nanowire layer 120 undergoes the surface treatment. In step S40, the metal layer 130 is formed on the substrate 110 and corresponding to the peripheral area PA, in which a portion of the metal layer 130 overlaps and contacts the metal nanowire layer 120 which has undergone the surface treatment, so as to form the overlapping region A.

In some embodiments, post-treatments may be performed on the substrate 110 after step S10, for example, a surface modification process is performed or an adhesive layer or a resin layer is additionally coated on the surface 111 of the substrate 110 to enhance the adhesion between the substrate 110 and other layers (e.g., the metal nanowire layer 120 and/or the metal layer 130).

In some embodiments, step S20 may further include performing a patterning process to the metal nanowire layer 120. Specifically, after the dispersion 10 including the metal nanowires 122 is coated on the surface 111 of the substrate 110 and cured/dried to make the metal nanowire layer 120 adhere to the surface 111 of the substrate 110, a patterning process can be performed to the metal nanowire layer 120, such that the metal nanowire layer 120 in the visible area VA and the peripheral area PA are respectively defined with their patterns. In detail, the metal nanowire layer 120 in the visible area VA can be patterned to form at least one touch sensing electrode TE, and the metal nanowire layer 120 in the peripheral area PA can be patterned to form an overlapping portion (also referred to as a first overlapping portion) that overlaps the metal layer 130 subsequently. In some embodiments, the metal nanowire layer 120 can be patterned through an etching process. In some embodiments, the metal nanowire layer 120 in the visible area VA and the peripheral area PA can be etched simultaneously with the aids of an etching mask (e.g., a photoresist), such that the metal nanowire layer 120 with pattern is formed in the visible area VA and the peripheral area PA in the same process. In more detail, when the metal nanowire 122 in the metal nanowire layer 120 is a silver nanowire, the main component of the etching solution can be $H_3PO_4$ (with a volume ratio of about 55% to about 70% $H_3PO_4$ in the etching solution) and $HNO_3$ (with a volume ratio of about 5% to about 15% $HNO_3$ in the etching solution) to remove the silver material. In some other embodiments, the main component of the etching solution may be ferric chloride/nitric acid or phosphoric acid/hydrogen peroxide. In addition, in some embodiments, the patterning process can also be performed after step S30. That is, after step S20 is performed to form the metal nanowire layer 120 on the substrate 110, step S30 is performed to carry out the surface treatment to the metal nanowire layer 120, and then the patterning process is performed. In other words, the patterning process of the metal nanowire layer 120 can be performed before or after the surface treatment of the metal nanowire layer 120, and the present disclosure is not limited thereto.

Subsequently, in step S40, the metal layer 130 is formed in the peripheral area PA, such that the metal layer 130 partially overlaps the metal nanowire layer 120 which has undergone the surface treatment (i.e., the first overlapping portion), thereby forming the overlapping region A. In some embodiments, the metal layer 130 including a photosensitive metal (e.g., photosensitive silver) may be formed on the entire surface of the substrate 110 in the peripheral area PA to partially cover the first overlapping portion. Then, the metal layer 130 may be patterned to define the pattern of the metal layer 130 and form at least one peripheral circuit T and a second overlapping portion that overlaps the first overlapping portion of the metal nanowire layer 120. When the material in the metal layer 130 is photosensitive silver, the photosensitive silver can be directly exposed and developed to form the pattern of the metal layer 130. In more detail, by using photosensitive silver as the material of the metal layer 130, the steps of applying photoresist, exposing and developing the photoresist, and etching the metal layer 130 through the developed photoresist can be omitted. As such, the pattern of the metal nanowire layer 120 can be prevented from damage due to the etching process performed to form the pattern of the metal layer 130. After the above steps, the touch sensor 100 having the overlapping region A formed by the overlap and contact in the peripheral area PA between a portion of the metal layer 130 and a portion of the metal nanowire layer 120 can be manufactured.

The touch sensor of the present disclosure can be assembled with other electronic devices, such as a display with touch function. For example, the substrate can be bonded to a display device (e.g., a liquid crystal display device or an organic light-emitting diode display device), and optical adhesive or other adhesives can be used to bond therebetween. The touch sensor may also be bonded with an outer cover layer (e.g., a protective glass) through the optical adhesive. The touch sensor of the present disclosure can also be applied to electronic devices such as portable phones, tablets, and notebooks, and can also be applied to flexible products. The touch sensor of the present disclosure can also be applied to a polarizer (e.g., the polarizer can be directly used as being the substrate of the touch sensor), wearable devices (e.g., watches, glasses, smart clothes, and smart shoes), and automotive devices (e.g., dashboards, driving recorders, rearview mirrors, and windows).

According to the aforementioned embodiments of the present disclosure, the touch sensor of the present disclosure has an overlapping region formed by a portion of the metal nanowire layer and a portion of the metal layer overlapped with each other in the peripheral area. The metal nanowire layer of the present disclosure may undergo a suitable surface treatment, such that the overlapping region formed by the metal layer and the metal nanowire layer can be provided with a good contact effect while having a required contact area. Accordingly, the touch sensor of the present disclosure can not only meet the requirements of the narrow bezel design generally recognized by the industry, but also meet the requirements of the contact impedance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch sensor having a visible area and a peripheral area on at least one side of the visible area, comprising:
   a substrate;
   a metal nanowire layer disposed on the substrate and having a first portion corresponding to the visible area and a second portion corresponding to the peripheral area; and
   a metal layer disposed on the substrate and corresponding to the peripheral area, wherein a portion of the metal layer overlaps and contacts at least a portion of the second portion of the metal nanowire layer, such that an overlapping region is formed, a contact area of the overlapping region is between 0.09 mm$^2$ and 1.20 mm$^2$, and a contact impedance of the overlapping region is less than 50 Ω.

2. The touch sensor of claim 1, wherein the contact area is a vertical projection area of the overlapping region on the substrate.

3. The touch sensor of claim 1, wherein the contact area is between 0.09 mm$^2$ and 0.60 mm$^2$.

4. The touch sensor of claim 1, wherein the contact impedance is less than 40 Ω.

5. The touch sensor of claim 1, wherein the metal nanowire layer comprises a matrix, a plurality of first metal nanowires, and a plurality of second metal nanowires, each of the first metal nanowires is completely embedded in the matrix, and each of the second metal nanowires is partially embedded in the matrix.

6. The touch sensor of claim 5, wherein each of the second metal nanowires in the second portion of the metal nanowire layer has a first portion embedded in the matrix and a second portion protruding from an upper surface of the matrix, and the second portions of the second metal nanowires are embedded in the metal layer.

7. The touch sensor of claim 5, wherein each of the second metal nanowires has a first portion embedded in the matrix and a second portion protruding from an upper surface of the matrix.

8. The touch sensor of claim 7, wherein the metal nanowire layer further comprises:
   a plurality of first membrane structures, wherein each of the first membrane structures is disposed at an interface between the matrix and each of the first metal nanowires; and
   a plurality of second membrane structures, wherein each of the second membrane structures is disposed at an interface between the matrix and the first portion of each of the second metal nanowires.

9. The touch sensor of claim 8, wherein each of the first membrane structures covers each of the first metal nanowires to form a first covering structure, and each of the second membrane structures covers the first portion of each of the second metal nanowires to form a second covering structure.

10. The touch sensor of claim 8, wherein a material of each of the first membrane structures and the second membrane structures comprises a polyethylene derivative.

11. The touch sensor of claim 1, wherein a material of the metal layer comprises a photosensitive silver.

12. The touch sensor of claim 1, wherein the first portion of the metal nanowire layer constitutes a touch sensing electrode, and a second portion of the metal layer constitutes a peripheral circuit.

13. A manufacturing method of a touch sensor having a visible area and a peripheral area on at least one side of the visible area, comprising:
   providing a substrate;
   forming a metal nanowire layer on the substrate and corresponding to the visible area and the peripheral area;
   performing a surface treatment to the metal nanowire layer; and
   forming a metal layer on the substrate and corresponding to the peripheral area, wherein a portion of the metal layer overlaps and contacts the metal nanowire layer which has undergone the surface treatment, such that an overlapping region is formed, a contact area of the overlapping region is between 0.09 mm$^2$ and 1.20 mm$^2$, and a contact impedance of the overlapping region is less than 50 Ω.

14. The manufacturing method of a touch sensor of claim 13, wherein performing the surface treatment to the metal nanowire layer comprises:
   performing a vacuum plasma process to the metal nanowire layer, wherein the vacuum plasma process is performed by an argon plasma with a power of 2 kW to 8 kW and a flow rate of 1500 standard cubic centimeters per minute (sccm) to 2500 sccm, and a time of the vacuum plasma process is between 20 minutes and 30 minutes.

15. The manufacturing method of a touch sensor of claim 13, wherein the metal nanowire layer comprises a matrix, a plurality of metal nanowires, and a plurality of membrane structures, each of the metal nanowires has a first portion embedded in the matrix and a second portion protruding from an upper surface of the matrix, each of the membrane structures covers each of the metal nanowires, and performing the surface treatment to the metal nanowire layer comprises:
   removing each of the membrane structures covering the second portion of each of the metal nanowires, such that the second portion of each of the metal nanowires is exposed.

16. The manufacturing method of a touch sensor of claim 13, wherein the metal nanowire layer comprises a matrix, a plurality of metal nanowires, and a plurality of membrane structures, the membrane structures are distributed on an upper surface and in an inner portion of the matrix, and performing the surface treatment to the metal nanowire layer comprises:
   removing the membrane structures distributed on the upper surface of the matrix, such that the upper surface of the matrix is exposed.

17. The manufacturing method of a touch sensor of claim 13, wherein the metal nanowire layer which has undergone the surface treatment comprises a matrix and a plurality of metal nanowires, each of the metal nanowires has a first portion embedded in the matrix and a second portion protruding from an upper surface of the matrix, and the metal layer is formed corresponding to the peripheral area such that the second portion of each of the metal nanowires in the peripheral area is embedded in the metal layer.

18. The manufacturing method of a touch sensor of claim 13, wherein forming the metal nanowire layer on the substrate comprises:

performing a patterning step to the metal nanowire layer, such that a touch sensing electrode is formed.

19. The manufacturing method of a touch sensor of claim 13, wherein forming the metal layer on the substrate comprises:
performing a patterning step to the metal layer, such that a peripheral circuit is formed.

20. The manufacturing method of a touch sensor of claim 13, wherein:
forming the metal nanowire layer on the substrate comprises forming a membrane structure around metal nanowires of the metal nanowire layer, and
performing the surface treatment to the metal nanowire layer comprises removing the membrane structure from portions of one or more of the metal nanowires protruding above a matrix of the metal nanowire layer, wherein the membrane structure remains between the matrix and the metal nanowires embedded in the matrix.

* * * * *